United States Patent
Numajiri

(10) Patent No.: US 8,242,618 B2
(45) Date of Patent: Aug. 14, 2012

(54) WIND TURBINE GENERATOR

(75) Inventor: Tomohiro Numajiri, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/516,423

(22) PCT Filed: Jun. 11, 2008

(86) PCT No.: PCT/JP2008/060716
§ 371 (c)(1),
(2), (4) Date: Jun. 9, 2009

(87) PCT Pub. No.: WO2009/150729
PCT Pub. Date: Dec. 17, 2009

(65) Prior Publication Data
US 2011/0095537 A1    Apr. 28, 2011

(51) Int. Cl.
*F03D 9/00* (2006.01)
(52) U.S. Cl. ............................................. 290/44; 416/9
(58) Field of Classification Search .................... 290/44, 290/55; 416/9; 415/4.1
See application file for complete search history.

(56) References Cited

U.S. PATENT DOCUMENTS

| | | | |
|---|---|---|---|
| 4,408,954 A * | 10/1983 | Earle | 416/9 |
| 6,327,957 B1 * | 12/2001 | Carter, Sr. | 91/41 |
| 7,436,083 B2 * | 10/2008 | Shibata et al. | 290/44 |
| 7,762,771 B2 * | 7/2010 | Nies | 416/43 |
| 2010/0109327 A1 * | 5/2010 | Nielsen et al. | 290/44 |
| 2010/0166567 A1 * | 7/2010 | Calley | 416/241 R |

FOREIGN PATENT DOCUMENTS

JP    2007051585 A    1/2007

* cited by examiner

*Primary Examiner* — Michael Zarroli
(74) *Attorney, Agent, or Firm* — Kanesaka Berner & Partners, LLP

(57) ABSTRACT

A wind turbine generator is provided in which a gear having a large diameter is not required in a yaw drive device (30) of a yaw system (10A). The yaw drive device (30) of the yaw system (10A), which revolves a nacelle (3) depending on the wind direction, includes a electric motor (31) which is fixedly provided on a nacelle base plate (12), with an output shaft (31a) substantially aligned with a pivot of the nacelle (3). The output shaft (31a) and a fixed-side support member (2b) provided in the vicinity of an upper end of the tower (2) are coupled by a coupling shaft (33) having couplings (32) provided at both ends thereof.

7 Claims, 7 Drawing Sheets

GENERATOR OUTPUT POWER

| θw\Ws | 0 | 2 | 5 | 10 | 20 | ... |
|---|---|---|---|---|---|---|
| 5 | 100 | ... | ... | ... | ... | ... |
| ⋮ | ... |  |  |  |  |  |
| 25 | ... |  |  |  |  |  |
| ⋮ | ... |  |  |  |  |  |

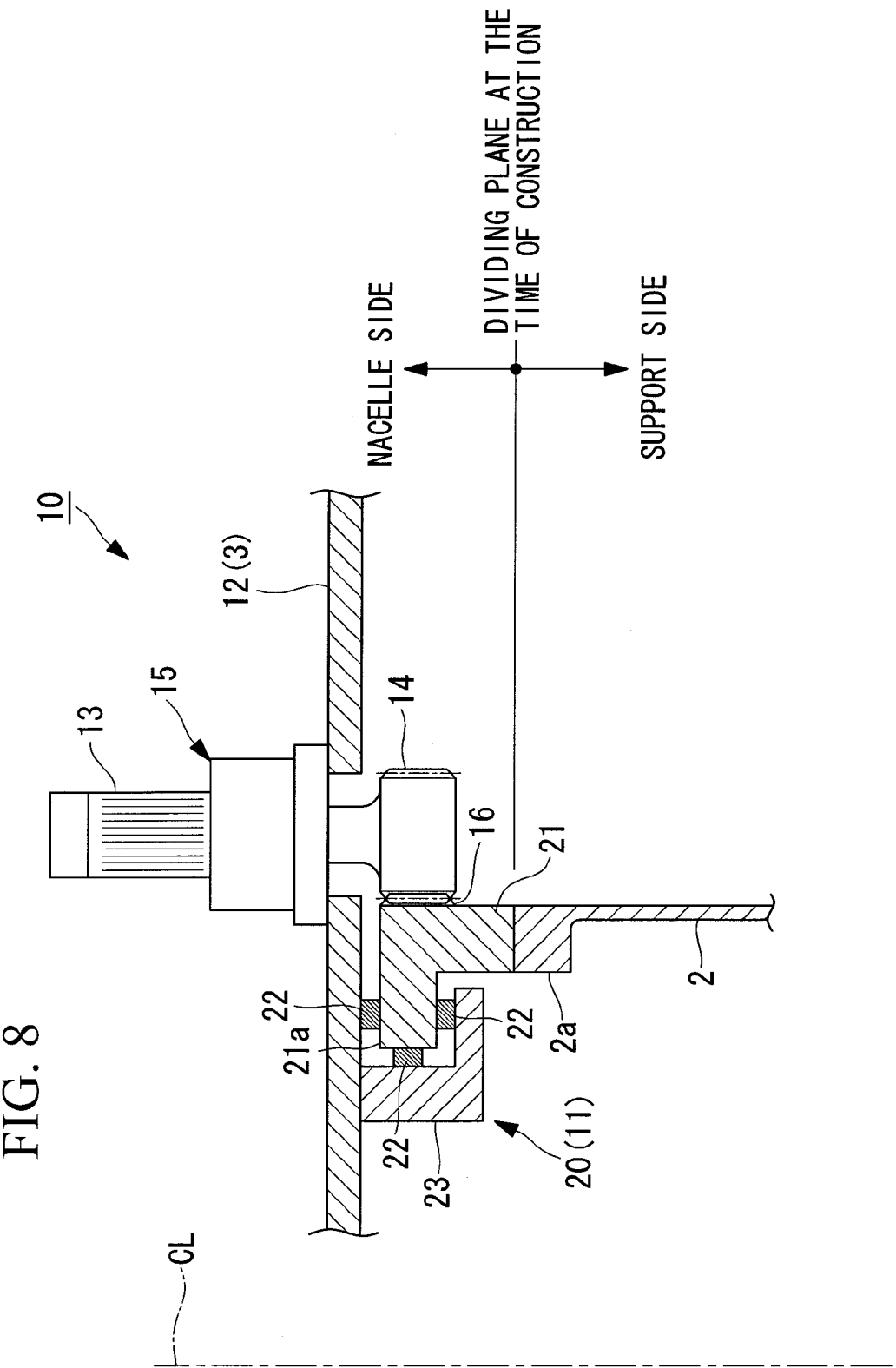

WIND TURBINE GENERATOR

CROSS-REFERENCE TO RELATED APPLICATIONS

The present Application is based on International Application No. PCT/JP2008/060716, filed on Jun. 11, 2008, and priority is hereby claimed under 35 USC §119 based on this application. This application is hereby incorporated by reference in its entirety into the present application.

TECHNICAL FIELD

The present invention relates to wind turbine generators having a yaw system which revolves the nacelle (wind-turbine main body) depending on the wind direction.

BACKGROUND ART

Wind turbine generators, in which a wind turbine is rotated by the force of wind and rotational movement thereof is transferred to a generator to generate electricity, are conventionally provided with a yaw system which revolves (turns) a nacelle depending on the wind direction.

The conventional yaw system includes a yaw drive device, a yaw slewing ring, and a yaw brake. Main components are disposed in the nacelle. Specifically, the nacelle, which includes the wind turbine and a powertrain that generates electricity by using the force of rotation of the wind turbine, is revolved at the top of a tower by the operation of the yaw system, and is pointed in the optimum direction for generating electricity depending on the wind direction.

In a conventional yaw system 10 shown in FIG. 8, a nacelle 3 is revolvably attached to a tower 2, which is a fixed side, via a yaw slewing ring 11 which uses a plain bearing 20 serving also as a yaw brake. In FIG. 8, reference numeral 12 indicates a nacelle base plate constituting the nacelle 3. A yaw drive device 15 which includes a electric motor 13 and a drive gear 14 is fixedly provided on the nacelle base plate 12.

The plain bearing 20 includes a fixed seat 21 which is fixed to a flange part 2a of the tower 2 and a bracket 23 which holds brake pads 22. The bracket 23 used in this case is a member having an approximately L-shaped cross-section. The upper end face of the bracket 23 is fixed to the lower face of the nacelle base plate 12.

In the plain bearing 20 having this structure, the brake pads 22 slidably support the upper and lower faces and the outer circumferential face of a rim part 21a provided on the fixed seat 21.

In this case, reference symbol CL indicates the axis center line of the tower 2 in FIG. 8. Thus, the yaw drive device 15 is disposed outside the tower 2 in this configuration example.

In the yaw drive device 15, the drive gear 14 is engaged with a ring gear 16, which is a fixed side, so that the nacelle (the nacelle base plate 12, the bracket 23, etc.), which is a movable side, can be revolved together with the drive gear 14 in response to the rotation of the electric motor 13 (for example, see Patent Document 1).

Patent Document 1:
Japanese Unexamined Patent Application, Publication No. 2007-51585

DISCLOSURE OF INVENTION

In recent years, wind turbine generators have tended to grow in size (in output power) more and more. Due to the increase in the sizes of wind turbine generators, the nacelle and the yaw system disposed on the top of the tower are also increased in size and weight.

In the yaw drive device 15 of the conventional technology described above, the drive gear 14 rotated by using the electric motor 13 as a driving source is engaged with the ring gear 16 to revolve the nacelle 3. Therefore, when the nacelle 3 is increased in size, the diameter of the ring gear 16 is thus increased. In other words, the ring gear 16 needs to be manufactured to have a diameter approximately identical to the inner diameter of the upper end portion of the tower 2 whose diameter is increased when the nacelle 3 is increased in size, and therefore, there is a problem in that the machining cost increases.

Further, in the above-described conventional structure, in order to precisely control backlash at the engagement portion of the drive gear 14 and the ring gear 16, precise machining of the nacelle base plate 12, which is a fixed side, is also required, thus increasing the cost.

Against this background, in the yaw systems of wind turbine generators, the development of a yaw drive device that does not require a gear having a large diameter is desired.

The present invention has been made in view of those circumstances, and an object thereof is to provide a wind turbine generator that does not require a gear having a large diameter in a yaw drive device of a yaw system.

In order to solve the above-described problems, the present invention employs the following solutions.

According to a first aspect, the present invention provides a wind turbine generator including a yaw system which includes a yaw drive device, a yaw slewing ring, and a yaw brake and revolves a nacelle provided on the top of a tower depending on a wind direction, in which the yaw drive device includes a yaw motor which is fixedly provided on a nacelle base plate, with an output shaft substantially aligned with an pivot of the nacelle, and the output shaft and a fixed-side support member provided in the vicinity of an upper end of the tower are coupled by a coupling shaft which has couplings provided at both ends thereof.

According to this wind turbine generator, because the yaw drive device includes the yaw motor which is fixedly provided on the nacelle base plate, with the output shaft substantially aligned with the pivot of the nacelle, and the output shaft and the fixed-side support member provided in the vicinity of the upper end of the tower are coupled by the coupling shaft which has the couplings provided at both ends thereof, a gear having a large diameter is not required in the drive system of the yaw drive device.

According to a second aspect, the present invention provides a wind turbine generator including a yaw system which includes a yaw drive device, a yaw slewing ring, and a yaw brake and revolves a nacelle provided on the top of a tower depending on a wind direction, in which the yaw drive device includes a yaw motor which is fixedly provided on a fixed-side support member provided in the vicinity of an upper end of the tower in a state where an output shaft is substantially aligned with a pivot of the nacelle, and the output shaft and the nacelle are coupled by a coupling shaft which has couplings provided at both ends thereof.

According to this wind turbine generator, because the yaw drive device includes the yaw motor which is fixedly provided on the fixed-side support member provided in the vicinity of the upper end of the tower, with the output shaft substantially aligned with the pivot of the nacelle, and the output shaft and the nacelle are coupled by the coupling shaft which has the couplings provided at both ends thereof, a gear having a large diameter is not required in the drive system of the yaw drive device. In this case, since the yaw drive device is provided in the tower, the weight of the nacelle can be reduced.

In the invention described above, a combination with active yaw is desired. In such a configuration, a driving torque required by the yaw motor can be reduced more than when the active yaw is not used.

According to the present invention, since the yaw drive device does not require a gear having a large diameter in the yaw system of the wind turbine generator, the cost of machining a gear having a large diameter can be reduced.

Further, since a gear having a large diameter is omitted from the yaw drive device, grease does not need to be supplied and a risk of leaking grease to the outside of the tower can be eliminated.

BRIEF DESCRIPTION OF DRAWINGS

FIG. 8 is a main-portion cross-sectional view showing a conventional example of a yaw system of a wind turbine generator.

EXPLANATION OF REFERENCE SIGNS

Figure 1:
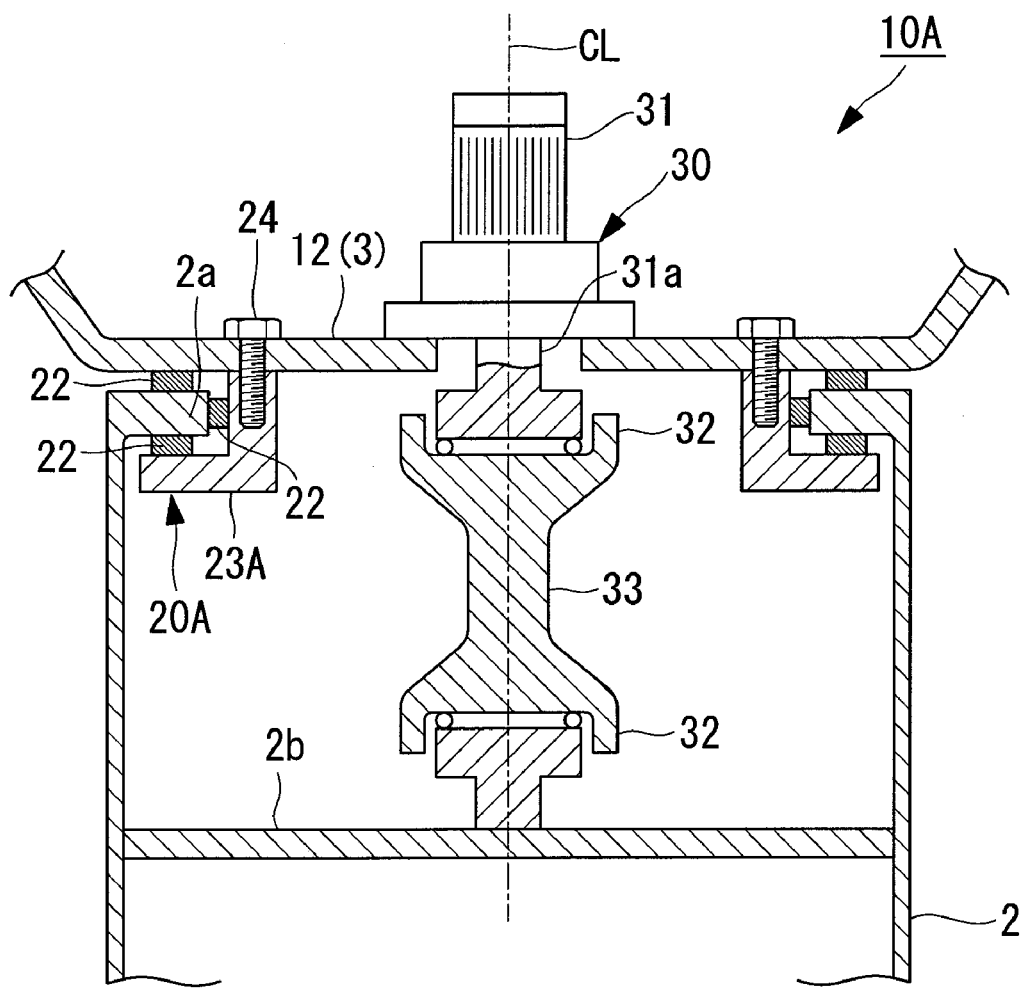
FIG. 1 is a main-portion cross-sectional view showing an example structure of a yaw system and the top portion of a tower as an embodiment of a wind turbine generator according to the present invention.

1: wind turbine generator
2: tower
2a: flange part
2b: inner flange
3: nacelle
4: rotor head
10A: yaw system
12: nacelle base plate
20A: plain bearing
22: sliding pad
23A: bracket
30: yaw drive device
31: electric motor (yaw motor)
31a: output shaft
32: coupling
33: coupling shaft

BEST MODE FOR CARRYING OUT THE INVENTION

A wind turbine generator according to an embodiment of the present invention will be described below with reference to FIGS. 1 and 2.

Figure 2:
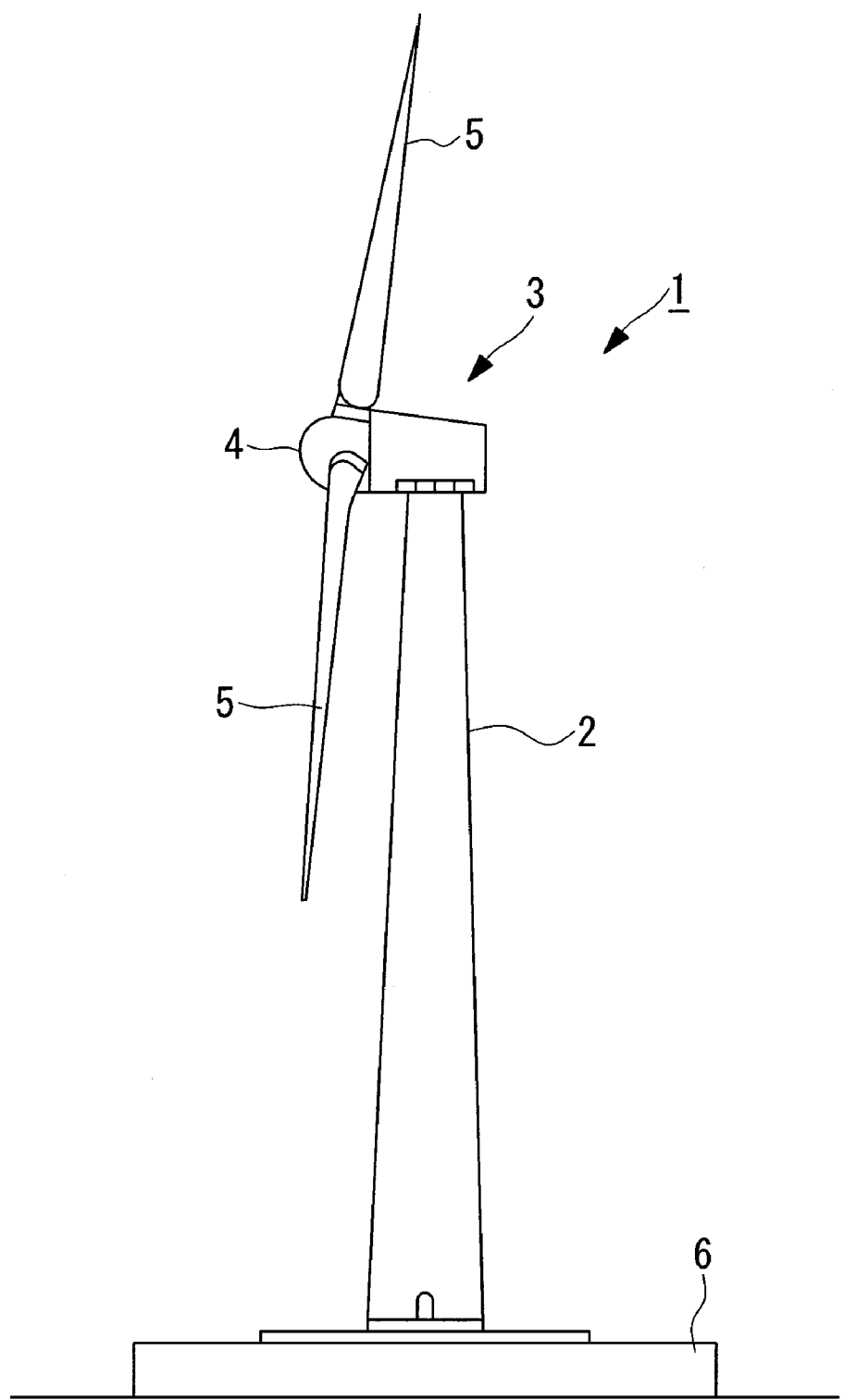
FIG. 2 is a view showing an example of the entire structure of the wind turbine generator according to the present invention.

A wind turbine generator 1 shown in FIG. 2 includes a tower 2 provided upright on a foundation 6, a nacelle 3 provided at the upper end of the tower 2, and a rotor head 4 which is supported so as to be able to rotate about a substantially horizontal rotary axis and which is provided on the nacelle 3.

A plurality of (for example, three) wind-turbine rotor blades 5 are radially attached to the rotor head 4 around its rotary axis. Thus, the force of wind blowing against the wind-turbine rotor blades 5 in a direction of the rotary axis of the rotor head 4 is converted into power which rotates the rotor head 4 about the rotary axis.

The wind turbine generator 1 includes a yaw system which revolves the nacelle 3 located at the upper end of the tower 2. The yaw system is a device which turns the nacelle 3 in the optimum direction depending on the wind direction to efficiently rotate the rotor head 4 to generate electricity.

A yaw system 10A shown in FIG. 1 includes a yaw drive device, a yaw slewing ring, and a yaw brake.

In an example structure shown in FIG. 1, an inward flange part 2a facing toward the shaft center is formed at the upper end of the tower 2, which is a fixed side. The flange part 2a is used to provide a plain bearing 20A functioning as the yaw slewing ring which revolvably supports the nacelle 3 revolved by a yaw drive device 30, to be described later, and functioning as the yaw brake which inhibits or stops revolution of the nacelle 3.

The plain bearing 20A is fixed to the lower face of the nacelle 3, specifically, to the lower face of a nacelle base plate 12 constituting the nacelle 3, via a bracket 23A having an approximately L-shaped cross-section. Since sliding pads 22 held by the bracket 23A slidably support (hold) the flange part 2a, the plain bearing 20A functions as the yaw slewing ring of the yaw system, which revolves the nacelle 3 at the top of the tower 2. Note that the bracket 23A is fixed at predetermined positions of the nacelle base plate 12 by bolts 24.

In the plain bearing 20A used in this case, a high polymer material having a low frictional coefficient, such as polyester, polyurethane, polyamide, acetal, or polyethylene terephthalate (PET), can be preferably used for the sliding pads 22.

In the plain bearing 20A, the sliding pads 22 held by the bracket 23A are provided so as to be brought into contact with the upper and lower faces of the flange part 2a and the inner circumferential face of the flange part 2a. Pressure is appropriately applied in advance to each of the sliding pads 22 brought into contact with the three faces of the flange part 2a. As a result, frictional force acts between the sliding pads 22 and the flange 2a. Thus, the plain bearing 20A also functions as the yaw brake, which gives a fixed-load brake force to the revolution of the nacelle 3.

Note that, in order to apply the above-mentioned pressure in advance, a known means for applying pressure in advance can be used. For example, a hydraulic cylinder (not shown) or the like is used to apply pressure to the sliding pads 22 to press them to the sliding faces.

In this case, the yaw drive device 30 is fixedly provided in the revolving nacelle 3. Specifically, a electric motor (yaw motor) 31 is fixedly provided on the nacelle base plate 12, and an output shaft 31a of the electric motor 31 is approximately aligned with the axis center position CL of the tower 2. In other words, the output shaft 31a of the electric motor 31 is located at the yaw-slewing center position which is approximately aligned with the axis center position of the plain bearing 20A. Note that a clutch, a damper, and/or a brake (which are not shown) may be provided in the electric motor 31.

The output shaft 31a of the electric motor 31 is coupled, at the yaw-slewing center position, to an inner flange 2b of the tower 2, which serves as a fixed-side support member in the yaw system 10A, via a coupling shaft 33 which has a pair of couplings 32 provided at upper and lower ends thereof. The couplings 32 used here are not particularly limited as long as they allow axial offset occurring between the axis center position of the inner flange 2b and the axis center position of the yaw drive device 30, and also allow the nacelle 3 to revolve with respect to the inner flange 2b.

Note that it is preferable that the inner flange 2b be provided with a manhole (not shown) to be used for construction, maintenance, etc. when needed.

In the yaw system 10A having the above-described structure, when the electric motor 31 of the yaw drive device 30 is driven, the output shaft 31a attempts to rotate in a desired direction. However, since the other end of the output shaft 31a is fixed to the inner flange 2b via the couplings 32 and the coupling shaft 33, the nacelle 3 on which the electric motor 31 is fixedly provided rotates with respect to the tower 2. At this time, the plain bearing 20A functions as the yaw slewing ring, which revolvably supports the nacelle 3.

In the yaw drive device 30 having this structure, since the output shaft 31a, which is approximately aligned with the pivot of the nacelle 3, is fixed to the inner flange 2b of the tower 2 via the pair of the couplings 32 and the coupling shaft 33, the nacelle 3 can be revolved without using a gear having a large diameter like the ring gear 16. In other words, the yaw drive device 30 of the present invention does not require a gear that has a large diameter which is about the same as the diameter of the upper end of the tower 2 and that increases the machining cost. Therefore, the cost of the yaw drive device 30 and that of the wind turbine generator 1 having the yaw drive device 30 can be reduced.

Further, the yaw drive device 30 of the present invention, in which the engagement portion of the drive gear 14 and the ring gear 16 is not included, does not need to have grease supplied to the engagement portion, thus causing no leakage of grease to the outside of the tower 2.

With a structure in which a gear having a large diameter is used to revolve and drive the nacelle 3, machining precision is required for the fixed face of the nacelle base plate 12 in order to precisely control backlash at the engagement portion. However, with the structure of the present invention, in which there is no engagement portion, the backlash does not need to be controlled, so that the machining precision required at a portion where the electric motor 31 is fixedly provided on the nacelle base plate 12 can be lowered to reduce the cost.

In the above-described embodiment, the electric motor 31 is fixedly provided on the nacelle base plate 12. However, the electric motor 31 may be fixed to the inner flange 2b by exchanging the positions of the electric motor 31 and a hub 32a.

Specifically, the yaw drive device 30 may be structured such that the electric motor 31 is fixedly provided on the inner flange 2b provided in the vicinity of the upper end of the tower 2, with the output shaft 31a approximately aligned with the pivot of the nacelle 3, and the output shaft 31a and the nacelle 3 are coupled by the coupling shaft 33 having the couplings 32 provided at both ends thereof. With this structure, a gear having a large diameter is not required in the drive system of the yaw drive device 30. Further, the yaw drive device 30 is provided in the tower 2, thereby reducing the weight of the nacelle 3. Thus, this structure is effective in allowing a crane required for transportation and construction to have a lower capacity.

It is desirable to use the yaw system 10A having the yaw drive device 30 in combination with yaw slewing drive control (also referred to as "active yaw") to be described below.

Figure 3:
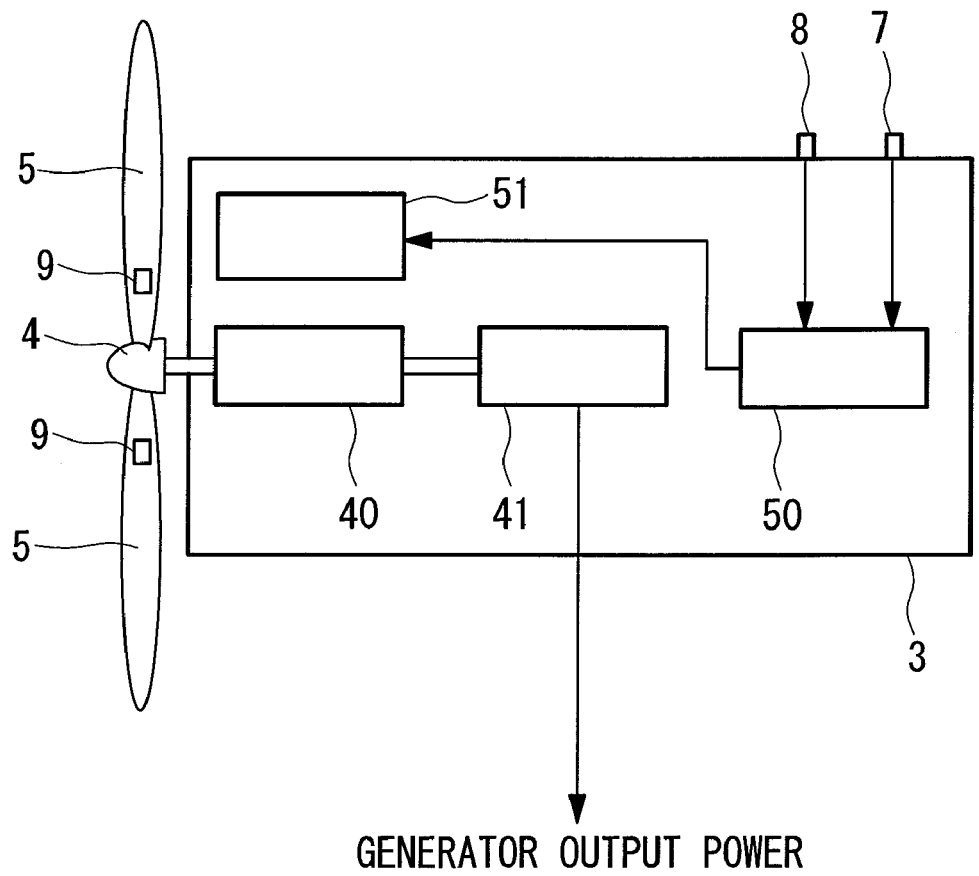
FIG. 3 is a block diagram showing an example of the schematic configuration of the inside of a nacelle, related to yaw slewing drive control (active yaw) of the wind turbine generator.

FIG. 3 is a block diagram showing an example of the configuration of the inside of the nacelle, related to active yaw applied to the wind turbine generator. An anemometer 7 which measures the value of ambient wind speed and an anemoscope 8 which measures wind direction are provided at appropriate places (for example, at upper portions) on the outer circumferential face of the nacelle 3. Further, each of the wind-turbine blades 5 is provided with a load measurement sensor (for example, an optical fiber sensor) 9 for measuring the load on the wind-turbine blade 5.

The anemoscope 8 measures a wind-direction deviation and outputs the wind-direction deviation as a measured value.

The load measurement sensor 9 measures, for example, the deformation of the wind-turbine blade 5 to measure the load corresponding to the amount of this deformation.

The nacelle 3 includes a generator 41 coupled to the rotor head 4 via a gearbox 40 which has the same shaft as the rotor head 4. Further, the nacelle 3 includes a wind-turbine control device 50 which performs operational control of the wind turbine, and a variable-pitch mechanism 51 which changes the pitch angle of each wind-turbine blade 5 in response to a control signal from the wind-turbine control device 50.

The wind-turbine control device 50 receives the load measurement values of the wind-turbine blades 5 measured by the respective load measurement sensors 9, the wind-direction deviation measured by the anemoscope 8, and the wind speed measured by the anemometer 7.

The wind-turbine control device 50 specifies the pitch angles of the respective wind-turbine blades 5 based on those pieces of received information and outputs control signals corresponding to the specified pitch angles to the variable-pitch mechanism 51. The variable-pitch mechanism 51 changes the pitch angles of the respective wind-turbine blades 5 based on the control signals given by the wind-turbine control device 50.

Figure 4:
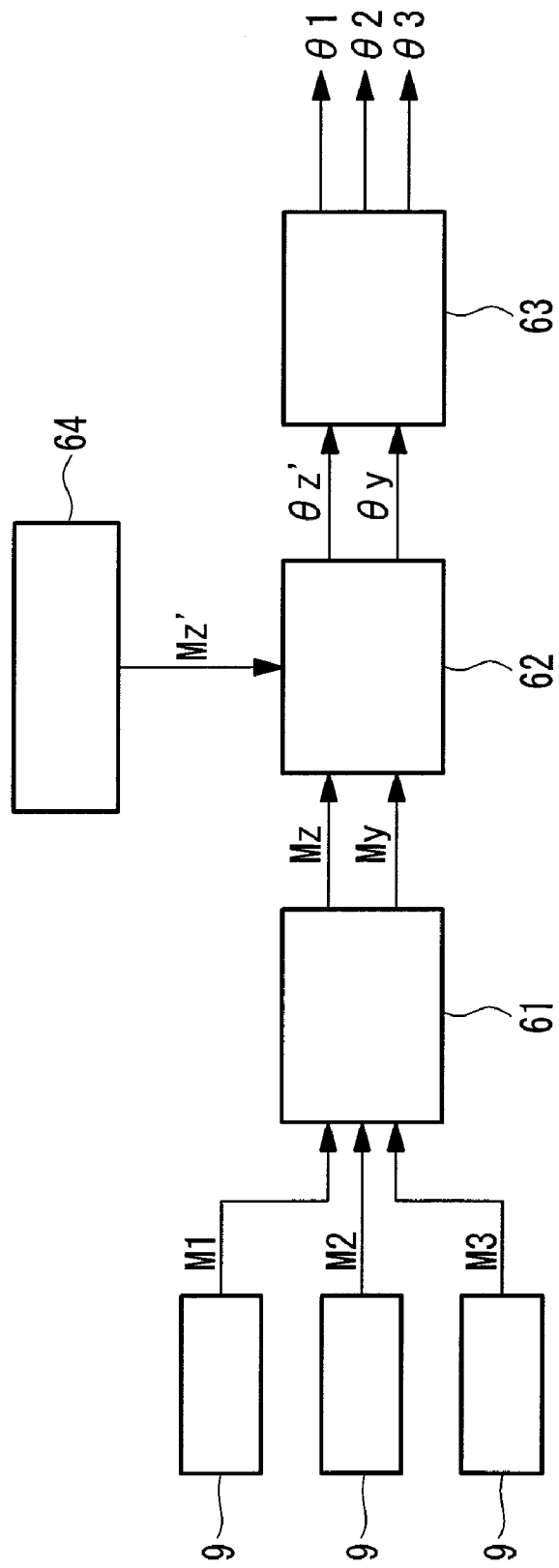
FIG. 4 is a control block diagram related to pitch-angle control of a variable-pitch mechanism shown in FIG. 3.

FIG. 4 is a diagram showing control blocks related to the pitch-angle control, provided for the wind-turbine control device 50.

As shown in FIG. 4, the wind-turbine control device 50 includes a moment calculation unit 61, a component-command-value setting unit 62, a pitch-angle-command setting unit 63, and a yawing control command value setting unit 64.

Figure 5:
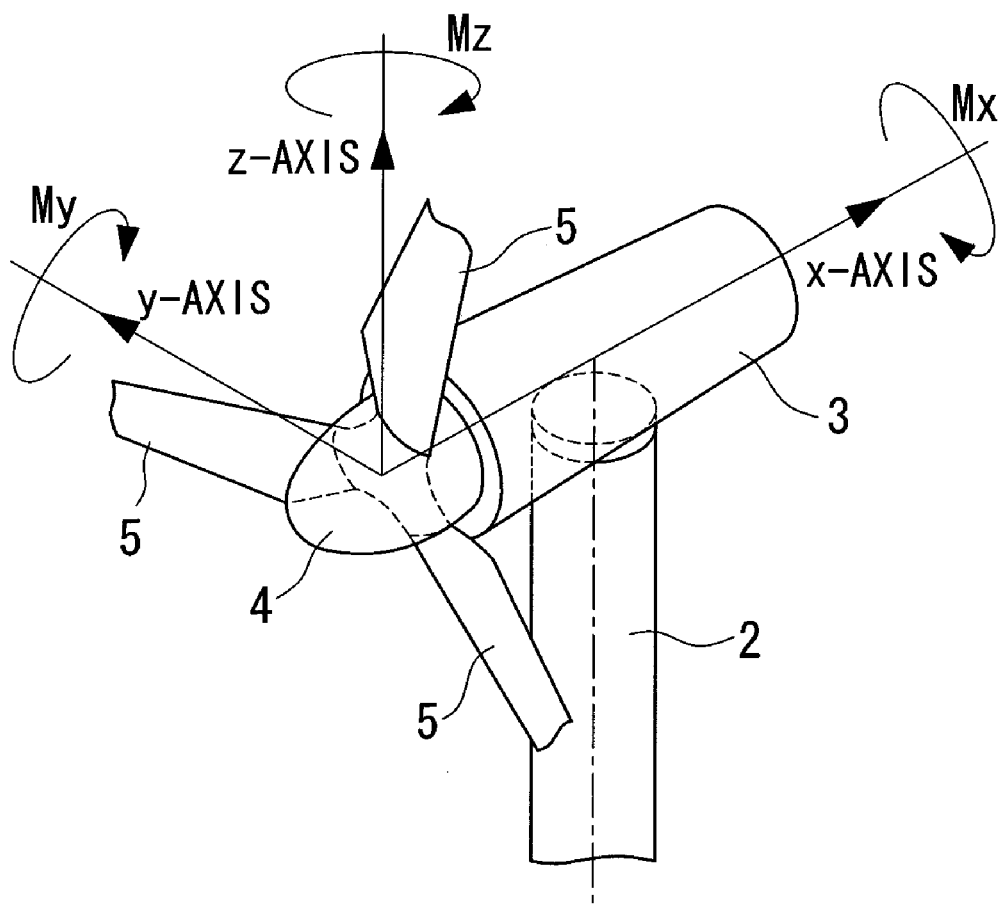
FIG. 5 shows the definitions of z, y, and x axes.

The moment calculation unit 61 applies coordinate transformation to the loads M1, M2, and M3 of the wind-turbine blades 5 measured by the respective load measurement sensors 9, to calculate a moment Mz about the z axis and a moment My about the y axis shown in FIG. 5. As shown in FIG. 5, the z axis is an axial line parallel to the main axis of the tower 2, the x axis is the rotary axis of the rotor head 4, and the y axis is an axial line orthogonal to the z axis and the x axis.

When the moments My and Mz are calculated, the moment calculation unit 61 outputs them to the component-command-value setting unit 62. The component-command-value setting unit 62 specifies an angle command value θy for the y axis and an angle command value θz for the z axis, based on the moments Mz and My calculated by the moment calculation unit 61.

Specifically, the component-command-value setting unit 62 calculates a reference command value for offsetting the moment My about the y axis and uses the reference command value as the angle command value θy about the y axis. Further, the component-command-value setting unit 62 calculates a reference command value for offsetting the moment Mz about the z axis, adds a yawing control command value Mz' received from the yawing control command value setting unit 64 to this reference command value, and uses the resultant value as an angle command value θz' about the z axis. The component-command-value setting unit 62 outputs the angle command values θy and θz' to the pitch-angle command setting unit 63.

The pitch-angle command setting unit 63 applies coordinate transformation to the received angle command values θy and θz' to specify pitch angle commands θ1, θ2, and θ3 of the wind-turbine blades 5 and outputs them to the variable-pitch mechanism 51. As a result, the variable-pitch mechanism 51 changes the pitch angles of the wind-turbine blades 5 based on the pitch angle commands θ1, θ2, and θ3. Therefore, the loads on the wind-turbine blades 5 are reduced, and the nacelle 3 is revolved about the z axis by an amount corresponding to the yawing control command value Mz'.

Next, the yawing control command value setting unit 64 will be described with reference to FIG. 6.

Figures 6, 7:
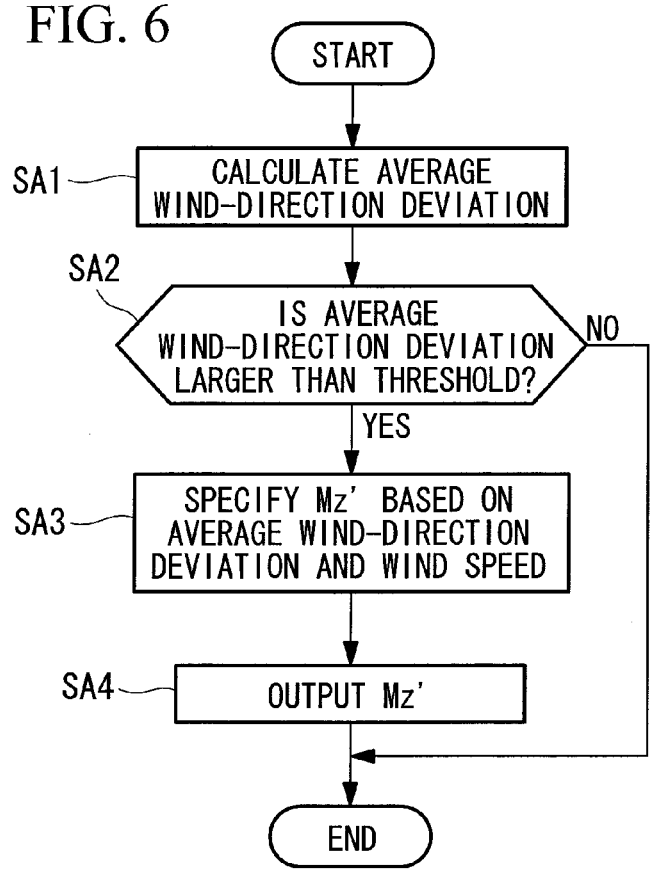
FIG. 6 is a flowchart showing a processing procedure performed by a yawing control command value setting unit shown in FIG. 4.
FIG. 7 shows an example of a yawing control command value table.

FIG. 6 is a flowchart showing a processing procedure performed by the yawing control command value setting unit 64. Note that the processing shown in FIG. 6 is repeatedly performed at predetermined time intervals.

The yawing control command value setting unit 64 calculates the average of wind-direction deviations received from the anemoscope 8 for an elapsed predetermined period of time (Step SA1).

Then, it is judged whether the average wind-direction deviation calculated in Step SA1 is larger than a threshold specified in advance. When it is judged that the average wind-direction deviation is equal to or lower than the threshold, it is recognized that the nacelle 3 is pointed in a desired direction with respect to the wind direction. The processing ends without subjecting the nacelle 3 to yaw slewing driving.

On the other hand, when it is judged that the average wind-direction deviation exceeds the threshold, it is recognized that the nacelle 3 is not pointed in the optimum direction with respect to the wind direction. In Step SA3, a yawing control command value is specified. Specifically, the yawing control command value setting unit 64 refers to a yawing control command value table which is held in advance, and obtains a yawing control command value identified by the average wind-direction deviation calculated in Step SA1 and by the wind speed received from the anemometer 7.

FIG. 7 shows an example of the yawing control command value table. As shown in FIG. 7, in the yawing control command value table, each yawing control command value is specified in association with a pair of values for the wind speed and the average wind-direction deviation. The yawing control command value setting unit 64 outputs the obtained yawing control command value to the component-command-value setting unit 62.

Thus, the yawing control command value specified in association with the wind speed and the wind direction is added to the reference command value about the z axis, to make the nacelle 3 revolve about the z axis by an amount corresponding to the yawing control command value.

As described above, according to the wind turbine generator 1 having the active yaw, a moment to an extent corresponding to the yawing control command value Mz' is generated for each of the wind-turbine blades 5, and the moment is used to make the nacelle 3 revolve about the main shaft of the tower 2. As described above, the pitch angles of the wind-turbine blades 5 are controlled, thereby revolving the nacelle 3 by using the force of air. Thus, the electric motor 31 disposed in the nacelle 3 can be reduced in size. Further, the frequency of use of the electric motor 31 can be reduced and a reduction in electrical power consumption can be achieved.

In the above description, the yawing control command value setting unit 64 obtains a yawing control command value from the yawing control command value table. Instead of this method, another method may be used in which the yawing control command value setting unit 64 holds an arithmetic expression having the average wind-direction deviation and the wind speed as parameters, and the average wind-direction deviation and the wind speed are substituted into the arithmetic expression, thereby obtaining a yawing control command value.

As described above, when the yaw drive device 30 employs the configuration and the control that are combined with the active yaw, it is possible to reduce the driving torque required by the electric motor 31 to achieve a reduction in size and weight, compared with a configuration without the active yaw.

Further, since the yaw system 10A employs the plain bearing 20A by effectively using the flange 2a formed on the upper end of the tower 2, the number of components of the plain bearing 20A is reduced, thereby allowing a reduction in weight.

Further, the plain bearing 20A, structured by using (sharing) the flange part 2a of the tower 2, functions as both a yaw slewing ring and a yaw brake, which are conventionally separate structures. Therefore, the number of components of the entire yaw system, which is provided on the top of the tower 2 to revolve the nacelle 3, is also reduced to allow a reduction in size and cost.

When the upper structure of the tower 2 is reduced in weight, an advantage is provided in that the loads imposed on the tower 2 and the foundation 6 and the load imposed on a crane required for construction are reduced.

Note that the present invention is not limited to the above-described embodiment, and modifications can be appropriately made without departing from the scope of the present invention.

The invention claimed is:

1. A wind turbine generator comprising:
   a yaw system which includes a yaw drive device, a yaw slewing ring, and a yaw brake for revolving a nacelle provided on the top of a tower depending on a wind direction, wherein the yaw drive device includes a yaw motor which is fixedly provided on a nacelle base plate, and an output shaft of the yaw drive device substantially aligned with a pivot of the nacelle, and
   a fixed-side support member provided in the vicinity of an upper end of the tower and coupled to the output shaft by a coupling shaft which has couplings provided at both ends thereof.

2. The wind turbine generator according to claim 1, wherein the output shaft is substantially aligned with a vertical axis of the tower.

3. The wind turbine generator according to claim 1, wherein the output shaft and the coupling shaft are coaxially arranged.

4. A wind turbine generator comprising:
   a yaw system which includes a yaw drive device, a yaw slewing ring, and a yaw brake for revolving a nacelle provided on the top of a tower depending on a wind direction,
   wherein the yaw drive device includes a yaw motor which is fixedly provided on a fixed-side support member provided in the vicinity of an upper end of the tower, and an output shaft of the yaw drive device substantially aligned with an pivot of the nacelle, and the output shaft and the nacelle are coupled by a coupling shaft which has couplings provided at both ends thereof.

5. The wind turbine generator according to claim 4, wherein the output shaft is substantially aligned with a vertical axis of the tower.

6. The wind turbine generator according to claim 4, wherein the output shaft and the coupling shaft are coaxially arranged.

7. The wind turbine generator according to claim 4, wherein the yaw drive device is arranged in the tower.

* * * * *